United States Patent Office 3,436,227
Patented Apr. 1, 1969

3,436,227
METHOD FOR REDUCING FOAM IN
INSTANT COFFEE
Robert J. Bergeron, Springfield Township, Hamilton County, Eddy R. Hair, Colerain Township, Hamilton County, and Frederick M. Joffe, Cincinnati, Ohio, assignors to The Folger Coffee Company, Cincinnati, Ohio, a corporation of Ohio
No Drawing. Filed Jan. 3, 1966, Ser. No. 517,927
Int. Cl. C23f 1/08
U.S. Cl. 99—71     4 Claims

ABSTRACT OF THE DISCLOSURE

An instant coffee product containing an effective amount for reducing foam and coffee scum in the reconstituted liquid coffee (i.e., 10–2000 p.p.m. by weight of the dry instant coffee) of a hydrocarbon substituted polycarboxylic acid. Preferred defoaming agents are malic stearate, tartaric mono- and distearate and lauryl malonic acid.

---

This invention relates to an improved instant coffee product. More specifically, it relates to a dry, water-soluble coffee extract which produces little or no coffee foam or scum when reconstituted with hot water.

Instant coffee can be prepared in a number of ways. Most commonly it is manufactured by spray drying an aqueous coffee extract to produce a dry solid product in the form of tiny hollow granules. Instant coffee has gained substantial commercial acceptance in recent years, but still possesses a number of problems which require solution before a totally acceptable product will become available to the consumer.

One such problem which has been receiving some attention in recent years is the existence of coffee foam, an unsightly froth which forms on the surface of the coffee liquid when hot water is added to the instant coffee granules. The foam is thought to be caused by air which is present within and between the instant coffee granules. The air forms a foam when entrapped by the addition of water and the foam apparently is stabilized by some natural constituent of the coffee, possibly a proteinaceous substance. The foam will vary in amount from a layer which dominates the entire liquid surface to a thin ring or arc which attaches to the cup surface at the top of the coffee liquid. The problem is accentuated in many households by the failure of the consumer to use boiling water in preparing the coffee. When cooler water is used, the foam problem increases.

In addition, coffee foam is generally accompanied by a "scum" of insoluble materials which are either natural constituents of the coffee or which are produced during the production of the instant coffee. Either alone or in combination, the foam and scum present an unappetizing appearance which is undesirable for liquid coffee.

Several attempts have been made to find additives capable of solving the foam and scum problems. Such an additive for use in instant coffee must be capable of preventing the formation of the foam and scum, or else capable of eliminating them shortly after the addition of water. Further, the additive must not produce objectionable appearance, odor or flavor changes in either the dry product or the reconstituted coffee liquid.

Several recent attempts to solve the foaming problem are shown in Barch et al., U.S. Patent 2,929,716 issued Mar. 22, 1960, and Breivik et al., U.S. Patent 3,100,151 issued August 6, 1963. The former patent suggests the use of $C_{12}$ to $C_{20}$ fatty acids or their salts as instant coffee defoamers, whereas the latter patent teaches the use of monoglycerides of fatty acids for the same purpose. While these materials do offer improvements, they have not proved to be wholly satisfactory for several reasons. Neither additive is readily dispersible in water and therefore, if added prior to the drying operation, can produce instant coffee granules with an uneven distribution of defoamer which can lead to unpredictable results when the product is used. Further, neither is highly effective at removing coffee scum and, when used at higher concentrations, they often produced a scum of their own on the surface of the coffee liquid. Additionally, the monoglyceride produces a more coarse foam rather than eliminating the foam entirely.

Accordingly, it is an object of this invention to provide an improved instant coffee product.

It is a further object to provide an instant coffee product which produces little or no foam or scum when reconstituted with water.

It is a further object to provide an instant coffee product containing an additive which, at low concentrations, is capable of reducing coffee foam and scum when the instant coffee is reconstituted with hot water.

These and other objects will become apparent from the following description and claims.

The objects of this invention are achieved by providing an instant coffee containing a small but effective amount of a substituted polycarboxylic acid containing an acid moiety selected from the group consisting of dicarboxylic acids and tricarboxylic acids having from 3 to 6 carbon atoms, and at least one hydrophobic substituent selected from the group consisting of R—CH$_2$— and

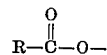

wherein R is a hydrocarbon group containing from about 9 to about 21 carbon atoms. These substituted polycarboxylic acids can be saturated or unsaturated. Preferably, the substituted polycarboxylic acid contains only one hydrophobic substituent and R is a straight chain hydrocarbon group.

The instant coffee product of this invention is substantially free of coffee foam and scum problems when used with hot water to produce a reconstituted coffee liquid. Coffee foam and scum formation is curtailed and any foam or scum which does form is eliminated or substantially reduced in a short period of time, such as about two minutes.

The instant coffees contemplated for use in this invention are dry, granular, water-soluble coffee extracts prepared by any of a number of processes well known to the average skilled worker in the art. These instant coffee granules usually range in size from about 30μ to about 400μ. The most common, and the type with the most serious foam problem, is conventional spray-dried instant coffee. While many variations are known, instant coffees of this type are prepared by extracting roast and ground coffee under pressure with hot water. For example, roast and ground coffee can be placed in a conventional extraction system and extracted at about 0 to 300 p.s.i.g. with about 150° F. to 375° F. water at a water to coffee weight ratio of about 1:1 to 3:1 to produce an aqueous coffee extract with a solids content of about 20% to about 35%, based on the weight of the liquid extract. The extract so obtained is filtered, cooled, and then spray-dried with, for example, 150° F. to 600° F. air at a pressure of about 50 to 4,000–10,000 p.s.i.g. The spray-dried granules formed are then screened to obtain the desirable size distribution, flavor and/or aroma boosters added if desired, and packaged for shipment and sale. The hollow granules formed by the conventional spray-drying process are conducive to air entrapment; consequently foam production is a particularly serious problem with spray-dried instant coffee. However, since similar problems do exist with instant coffee prepared by other methods, such as by foam, freeze or vacuum drying, these instant coffees are also within the scope of this invention.

The instant coffee additives disclosed herein are derived from polycarboxylic acids which have from 3 to 6 carbon atoms. Typical examples of these polycarboxylic acid starting materials are malonic acid, maleic acid, succinic acid, glutaric acid, adipic acid, malic acid, tartaric acid, arabitic acid, mucic acid and citric acid. To serve as instant coffee additives of this invention, the substituted polycarboxylic acids must contain at least one $RCH_2-$ (alkyl) or

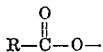

(acyloxy) substituent, wherein R is a hydrocarbon group containing from about 9 to about 21 carbon atoms. Preferably, R contains from 13 to 19 carbon atoms. Typical examples of alkyl substituents within the broad definition above are capryl, lauryl, myristyl, palmityl, stearyl, oleyl, linoleyl, arachidyl and behenyl substituents. Typical examples of the acyloxy substituents are caproyloxy, lauroyloxy, myristoyloxy, palmitoyloxy, stearoyloxy, oleoyloxy, linoleoyloxy, arachidoyloxy, and behenoyloxy substituents. The preferred instant coffee additives for use in this invention are selected from the group consisting of malic stearate, tartaric monostearate, tartaric distearate and laurylmalonic acid. The especially preferred member of this group is malic stearate.

The compounds described above as the instant coffee additives of this invention are generally not commercially available in bulk quantities at this time. However, they can be obtained from any of a number of chemical companies which prepare specialty chemicals upon request. Or if desired, they conveniently can be prepared by a number of known chemical syntheses. For example, laurylmalonic acid can be prepared by the reaction of a lauroyl halide with sodium malonic ester, as described in Whitmore, "Organic Chemistry," D. Van Nostrand Co., Inc., New York, 1945, p. 455. Malic stearate and tartaric mono- and distearate conveniently can be prepared by the reaction of the appropriate acid with stearoyl chloride in accordance with the process described by N. B. Tucker in U.S. Patent 2,251,695, issued Aug. 5, 1941. The same or related preparations can be used to prepare the other instant coffee additives of this invention.

In addition to having little tendency to form a "scum" of their own, the instant coffee additives of this invention have been found to exhibit significant coffee foam and scum reducing ability at concentrations as low as 10 p.p.m. by weight of dry instant coffee. Concentrations of these additives above about 2000 p.p.m. by weight of the dry instant coffee will produce little if any additional benefit, and therefore, while concentrations in excess of this amount can be used, it is economically undesirable. The preferred range of usage is from about 10 to about 500 p.p.m. by weight of the dry instant coffee. Naturally, these additives can be used in combination with each other or with other known additives useful for the same purpose or purposes, such as the defoaming agents of U.S. Patents 2,929,716 and 3,100,151 discussed above.

Acceptable, and often highly desirable, instant coffee additives within the scope of this invention can be made from materials derived from certain natural sources. For instance malic, tartaric and citric acids are natural constituents of green and roast coffees. Likewise, green and roast coffees contain a triglyceride oil rich in $C_{14}$ to $C_{20}$ combined fatty acids, particularly $C_{16}$ and $C_{18}$ combined fatty acids. Both types of acids can be removed from the coffee by a number of known processes. For example, the natural polycarboxylic acids named above are separable by selective adsorption of an aqueous coffee extract. Steam stripping of coffee oil will produce a mixture of free $C_{14}$ to $C_{20}$ fatty acids. The mixture of fatty acids can be reduced in high yields to the corresponding acyl chlorides by reaction with, e.g., phosphorus trichloride. The mixture of acyl chlorides can be reacted with the mixture of natural polycarboxylic acids according to the method described in the above-noted patent of N. B. Tucker, to form a mixture of the substituted polycarboxylic acids disclosed herein for use as the instant coffee additives of this invention.

The instant coffee additives used in this invention are surface active materials, that is, compounds which possess both hydrophilic and hydrophobic centers. Accordingly, the hydrophilic end of the molecule, which contains the two to three free and unsubstituted carboxyl groups, can also contain any other substituent which does not destroy its hydrophilic properties. For example, many common polycarboxylic acids, such as tartaric and mucic acids, contain one or more hydroxyl groups which will not be affected by the addition of the alkyl or acyloxy substituents described above and are perfectly acceptable for use in preparing the instant coffee additives of this invention. Other substituents which will not affect the hydrophilic properties are well known to those versed in the art and are included within the scope of this invention.

Analogously the hydrocarbon chain of the alkyl or acyloxy group or groups can contain one or more substituents which do not adversely affect the hydrophobic properties of the hydrocarbon chain without deviating from this invention. The location of one or more hydrophobic substituents on the polycarboxylic acid molecule is not material for purposes of this invention. Naturally, the hydrophobic substituent cannot be connected to any of the carboxyl groups, since it is essential that these groups remain in their free and unsubstituted form.

The instant coffee additives of this invention are readily dispersible in water; therefore, they can be added at any step during the production of the instant coffee. This is particularly beneficial in the preparation of spray-dried instant coffee because the instant coffee additives can be added prior to the spray drying step, either before or after the extraction of the roast and ground coffee. Coffee foam can be a problem in processing as well as in the reconstituted coffee liquid. Foam which forms in the coffee extract prior to spray drying tends to clog pumps, reduce spray dryer capacity and, because of the increased volume, necessitates the use of larger equipment. Addition of the instant coffee additives prior to spray drying greatly reduces this problem. In the preferred operation, the substituted polycarboxylic acid is added to an aqueous coffee extract having a solids content of from about 20% to about 35% based on the weight of the extract, and then spray dried. However, if addition at this stage of processing is not convenient, the instant coffee additive can be added to the spray-dried product prior to packaging, such as by spraying a solution or dispersion of the additive in liquid coffee or other carrier onto the spray-dried granules.

The following examples are given to demonstrate the effectiveness of the instant coffee additives of this invention when used to reduce coffee foam and scum in reconstituted coffee liquids. However, the examples are not intended to be limitations upon the invention.

EXAMPLE 1

An extract of roast and ground coffee (30% by weight coffee solids in water) was prepared in the customary manner by extracting the coffee with hot water in a conventional extraction system. The extract was placed in a hold tank and allowed to cool to approximately room temperature.

Malic stearate was prepared by the reaction of malic acid and stearoyl chloride as described above, by the method more particularly described in the above-noted patent of N. B. Tucker.

In a smaller, separate hold tank a 1% by weight water dispersion of malic stearate was prepared by simple mixing of a premeasured amount of malic stearate into a premeasured amount of water at room temperature. A sufficient amount of the malic stearate dispersion was added to the coffee extract to provide a concentration of about 50 p.p.m., based on the weight of coffee solids in the extract.

The coffee extract was pumped to a conventional spray dryer via a piston pump. Spray drying was conducted at about 200 p.s.i.g., the air inlet temperature was about 550° F., and the air outlet temperature was about 150° F. The resultant product was a dry, water-soluble instant coffee product with a particle size of from about 30μ to about 400μ which had malic stearate evenly dispersed therein at a concentration of about 50 p.p.m. In the same manner, two additional samples of instant coffee containing 100 and 500 p.p.m. of malic stearate were prepared.

The three instant coffee products described above then were used in preparing reconstituted coffee liquids and their foam and scum characteristics were compared to those of a "standard" coffee, an instant coffee product prepared in the same manner as described above but without the addition of malic stearate. In the test 2 g. of the instant coffee product were placed in a porcelain cup and 150 cc. of boiling distilled water were added. After two minutes the surface of the coffee liquid was inspected and given a Foam Grade according to the following scale:

Foam on all or nearly all the coffee surface _____ −2
Foam equal to amount of foam on the standard coffee _____ 0
None or only minimal foam on coffee surface _____ +2

The amount of scum on the surface of the coffee liquid was also noted and compared to the amount of scum on the standard coffee. The results are shown in Table I, below.

TABLE I

| Conc. of Malic Stearate (p.p.m) | Foam Grade (Av. of Three Tests) | Amount of Scum (Av. of Three Tests) |
|---|---|---|
| 0 (std.) | 0.0 | (Std.) |
| 50 | +1.5 | None. |
| 100 | +2.0 | Do. |
| 500 | +2.0 | Slight scum—less than standard. |

When in the above example, the malic acid portion of the malic stearate is replaced in whole or in part by malonic, succinic, glutaric, adipic, tartaric, glucaric, citric acids and mixtures thereof and/or the stearoyloxy portion of the malic stearate is replaced in whole or in part by capryl, lauryl, myristyl, palmityl, stearyl, oleyl, linoleyl, arachidyl, behenyl, lauroyloxy, myristoyloxy, palmitoyloxy, oleoyloxy, linoleoyloxy, arachidoyloxy, behenoyloxy substituents and mixtures thereof, substantially similar results are obtained in that significantly less foam forms on the surface of the coffee liquid, or a major portion of the foam and scum which does form rapidly disintegrates.

EXAMPLE 2

Tartaric mono- and distearates were prepared by the reaction of tartaric acid and stearoyl chloride as described above, by the method more particularly described in the above-noted patent of N. B. Tucker.

Spray-dried instant coffee product was prepared as described in Example 1 except that no malic stearate was added. 9.9 g. of this coffee was thoroughly ground with 0.1 g. of tartaric monostearate with a mortar and pestle. A measured amount of this ground mixture was added to a jar containing sufficient instant coffee product to give a final concentration of tartaric monostearate of 10 p.p.m., based on the weight of the coffee solids. The jar was mechanically tumbled for 10 minutes to obtain a uniform distribution of the tartaric monostearate in the instant coffee. In a similar manner concentrations of 100 p.p.m. and 1000 p.p.m. of tartaric monostearate in instant coffee product were prepared. In a similar manner, concentrations of 10 p.p.m., 100 p.p.m. and 1000 p.p.m. of tartaric distearate were prepared, all concentrations being based upon the weight of the dry coffee product.

Using the same test as described in Example 1, the foam reducing characteristics of these samples were tested and compared with a sample of instant coffee product which had neither tartaric monostearate nor tartaric distearate added. The results were:

TABLE II

| Conc. of tartaric monostearate (p.p.m) | Conc. of tartaric distearate (p.p.m.) | Foam Grade (Av. of Three Tests) | Amount of Scum (Av. of Three Tests) |
|---|---|---|---|
| 0 (std.) | | 0.0 (std.) | (Std.) |
| 10 | | +1.0 | None. |
| 100 | | +1.5 | Do. |
| 1,000 | | −2.0* | Do. |
| | 0 (std.) | 0 | (Std.) |
| | 10 | +1 | None. |
| | 100 | +1 | Do. |
| | 1,000g | +2 | Slight scum—less than standard. |

*For a yet unexplained reason, foam breakage at this concentration is slower than at lower concentrations. However as time progresses, the foam will disappear and the Foam Grade surpasses the Standard, giving a Foam Grade of +2 in about 10 to 15 minutes compared to +0.5 for the Standard.

EXAMPLE 3

Laurylmalonic acid was prepared by the reaction of lauryl chloride and sodium malonic ester as described above, and as more particularly described in Whitmore, also cited above.

Using the same procedure as Example 2, samples of instant coffee product were prepared containing 10 p.p.m., 100 p.p.m. and 1000 p.p.m. of laurylmalonic acid, based upon the weight of the dry coffee product. These samples were used in the test described in Example 1 and compared to a sample of instant coffee product to which no laurylmalonic acid had been added. The results were:

TABLE III

| Conc. of laurylmalonic acid (p.p.m.) | Foam Grade (Av. of Three Tests) | Amount of Scum (Av. of Three Tests) |
|---|---|---|
| 0 (std.) | 0 | (Std.) |
| 10 | +1 | None. |
| 100 | +2 | Slight scum—less than standard. |
| 1,000 | +2 | Bad scum—more than standard. |

When in the above example, the spray-dried instant coffee product is replaced by foam-dried, freeze-dried and vacuum-dried instant coffee products, substantially similar results are obtained in that significantly less foam and scum forms on the surface of the coffee liquid, or a major portion of the foam and scum which does form rapidly disintegrates.

What is claimed is:

1. The method of reducing coffee foam and scum in reconstituted coffee liquids prepared from instant coffee products which comprises adding to the instant coffee from about 10 to about 2000 parts per million based on the weight of the dry instant coffee, of a substituted polycarboxylic acid having an acid moiety selected from the group consisting of dicarboxylic acids and tricarboxylic acids having from 3 to 6 carbon atoms, and at least one hydrophobic substituent selected from the group consisting of R—CH$_2$— and

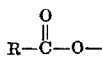

wherein R is a hydrocarbon group containing from about 9 to about 21 carbon atoms.

2. The method of claim 1 wherein the substituted polycarboxylic acid is selected from the group consisting of malic stearate, tartaric monostearate, tartaric distearate and dodecylmalonic acid.

3. The method of claim 2 wherein the concentration of the substituted polycarboxylic acid is from about 50 to about 500 parts per million, based on the weight of the dry instant coffee.

4. The method of claim 1 which comprises adding the substituted polycarboxylic acid to an aqueous coffee extract, and then spray drying the aqueous coffee extract.

References Cited
UNITED STATES PATENTS

| | | | |
|---|---|---|---|
| 2,929,716 | 3/1960 | Barch et al. | 99—71 |
| 3,100,151 | 8/1963 | Brewik et al. | 99—71 |
| 3,145,108 | 8/1964 | Howard | 99—118 |

MAURICE W. GREENSTEIN, *Primary Examiner.*

U.S. Cl. X.R.

99—152, 199